(12) United States Patent
Schatz et al.

(10) Patent No.: US 6,297,844 B1
(45) Date of Patent: Oct. 2, 2001

(54) VIDEO SAFETY CURTAIN

(75) Inventors: David A. Schatz, Needham; Sanjay Nichani, Natick; Robert Joel Shillman, Weston, all of MA (US)

(73) Assignee: Cognex Corporation, Natick, MA (US)

( * ) Notice: Subject to any disclaimer, the term of this patent is extended or adjusted under 35 U.S.C. 154(b) by 0 days.

(21) Appl. No.: 09/448,962

(22) Filed: Nov. 24, 1999

(51) Int. Cl.$^7$ .................................................. H04N 13/00

(52) U.S. Cl. ............................................. 348/43; 348/152

(58) Field of Search ................................ 348/42, 43, 44, 348/45, 152, 153, 154, 155, 167

(56) References Cited

U.S. PATENT DOCUMENTS

| | | | |
|---|---|---|---|
| 3,811,010 | * 5/1974 | Long | 348/152 |
| 4,236,180 | * 11/1980 | Cayzac | 348/152 |
| 4,249,207 | * 2/1981 | Harman et al. | 348/152 |
| 4,970,653 | 11/1990 | Kenue | 364/461 |
| 5,075,864 | 12/1991 | Sakai | 364/450 |
| 5,097,328 | 3/1992 | Boyette | 358/108 |
| 5,208,750 | 5/1993 | Kurami et al. | 364/424 |
| 5,301,115 | 4/1994 | Nouso | 364/460 |
| 5,529,138 | 6/1996 | Shaw et al. | 180/169 |
| 5,555,312 | 9/1996 | Shima et al. | 382/104 |
| 5,581,250 | 12/1996 | Khvilivitzky | 340/961 |
| 5,642,106 | 6/1997 | Hancock et al. | 340/988 |
| 5,706,355 | 1/1998 | Raboisson et al. | 382/104 |
| 5,742,504 | * 4/1998 | Meyer et al. | 364/188 |
| 5,917,937 | 6/1999 | Szeliski et al. | 382/154 |
| 5,961,571 | 10/1999 | Gorr et al. | 701/207 |
| 5,973,732 | * 10/1999 | Guthrie | 348/169 |

OTHER PUBLICATIONS

Abstract of U.S. Patent 3,686,434, Lemelson, Sep. 22, 1972.
Abstract of U.S. Patent 3,816,648, Noll et al., Jun. 11, 1974.
Abstract of U.S. Patent 3,858,043, Sick et al., Dec. 31, 1974.
Abstract of U.S. Patent 4,198,653, Kamin, Apr. 15, 1980.
Abstract of U.S. Patent 4,458,266, Mahoney, Jul. 3, 1984.
Abstract of U.S. Patent 5,245,422, Borcherts et al., Sep. 14, 1993.
Abstract of U.S. Patent 5,528,703, Lee, Jun. 18, 1996.
Abstract of U.S. Patent 5,577,130, Wu, Nov. 19, 1996.
Abstract of U.S. Patent 5,579,444, Dalziel et al., Nov. 26, 1996.
Abstract of U.S. Patent 5,589,928, Babbitt et al., Dec. 31, 1996.
Abstract of U.S. Patent 5,734,336, Smithline, Mar. 31, 1998.
Abstract of U.S. Patent 5,832,134, Aviaash et al., Nov. 3, 1998.
Abstract of U.S. Patent 5,870,220, Migdal et al., Feb. 9, 1999.

(List continued on next page.)

*Primary Examiner*—Chris Kelley
*Assistant Examiner*—Allen Wong
(74) *Attorney, Agent, or Firm*—Brian L. Michaelis (57) ABSTRACT

A three-dimensional (3-D) machine-vision safety-solution involving a method and apparatus for performing high-integrity, high efficiency machine vision. The machine vision safety solution converts two-dimensional video pixel data into 3-D point data that is used for characterization of specific 3-D objects, their orientation, and other object characteristics for any object, to provide a video safety "curtain." A (3-D) machine-vision safety-solution apparatus includes an image acquisition device arranged to view a target scene stereoscopically and pass the resulting multiple video output signals to a computer for further processing. The multiple video output signals are connected to the input of a video processor adapted to accept the video signals. Video images from each camera are then synchronously sampled, captured, and stored in a memory associated with a general purpose processor. The digitized image in the form of pixel information can then be stored, manipulated and otherwise processed in accordance with capabilities of the vision system. The machine vision safety solution method and apparatus involves two phases of operation: training and run-time.

17 Claims, 4 Drawing Sheets

OTHER PUBLICATIONS

Abstract of U.S. Patent 5,917,936, Katto, Jun. 29, 1999.

Abstract of U.S. Patent 5,974,192, Kundu, Oct. 26, 1999.

Umesh R. Dhond et al., *IEEE Transactions on Pattern Analysis and Machine Intelligence*, "Stereo Matching in the Presence of Narrow Occluding Objects Using Dynamic Disparity Search", vol. 17, No. 7, Jul. 1995, one page.

*Scientific Technologies Inc.*, "Theory of Operation and Terminology", pp. A50–A54.

*Scientific Technologies Inc.*, "Safety Strategy", pp. A24–A30.

*Scientific Technologies Inc.*, "Safety Standards for Light Curtains" pp. A14–A15.

Web document, "PLS Proximity Laser Scanner Applications", web site: www.sickoptic.com/safapp.htm, picked as of Nov. 4, 1999, 3 pages.

Web document, "New Dimensions in Safeguarding", web site: www.sickoptic.com/plsscan.htm, picked as of Nov. 3, 1999, 3 pages.

Web document, "Special Features", web site: www.sickoptic.com/msl.htm, picked as of Nov. 3, 1999, 3 pages.

Web document, "Capacitive Proximity Sensors", web site: www.theproductfinder.com/sensors/cappro.htm, picked as of Nov. 3, 1999, one page.

Web document, "The Safety Light Curtain", web site: www.theproductfinder.com/sensors/saflig.htm, picked as of Nov. 3, 1999, one page.

Web document, "WV 601 TV/FM", web site: www.leadtek.com/wv601.htm, picked as of Nov. 9, 1999, 3 pages.

Web document, "Product Information", web site: www.imagraph.com/products/IMAproducts–ie4.htm, picked as of Nov, 9, 1999, one page.

Web document,, "FlashPoint 128", web site: www.integraltech.com/128OV.htm, picked as of Nov. 9, 1999, 2 pages.

Web document, "Compatible Frame Grabber List", web site: www.masdkodak.com/frmegrbr.htm, picked as of Nov. 9, 1999, 6 pages.

* cited by examiner

VIDEO SAFETY CURTAIN

FIELD OF THE INVENTION

The present invention relates to safety/security systems, and more particularly to an automated system for observing an area, object or multiple objects within a safety/security zone.

BACKGROUND OF THE INVENTION

Industrial safety requires protection of operators, maintenance personnel, and bystanders from potential injuries from hazardous machinery or materials. In many cases the hazards can be reduced by automatically sounding an alarm or shutting off a process when dangerous circumstances are sensed, such as by detection of a person or object approaching a dangerous area. Industrial hazards include mechanical (e.g., crush, shear, impalement, entanglement), toxic (chemical, biological, radiation), heat and flame, cold, electrical, optical (laser, welding flash), etc. Varying combinations of hazards encountered in industrial processing can require numerous simultaneous safeguards, increasing capital expenses related to the process, and reducing reliability and flexibility thereof.

Machine tools can be designed with inherent safety features. Alternatively, hazards of machines or materials may be reduced by securing an enclosed machine or portions of the processing area during hazardous production cycles. Mechanical switches, photo-optical light-curtains and other proximity or motion sensors are well known safety and security components. These types of protection have the general disadvantage of being very limited in ability to detect more than a simple presence or absence (or motion) of an object or person. In addition, simple sensors are typically custom specified or designed for the particular machine, material, or area to be secured against a single type of hazard. Mechanical sensors, in particular, have the disadvantage of being activated by unidirectional touching, and they must often be specifically designed for that unique purpose. They cannot sense any other types of intrusion, nor sense objects approaching nearby, or objects arriving from an unpredicted direction. Even complicated combinations of motion and touch sensors can offer only limited and inflexible safety or security for circumstances in which one type of object or action in the area should be allowed, and another type should result in an alarm condition.

It is known to configure a light curtain (or "light barrier") by aligning a series of photo-transmitters and receivers in parallel to create a "curtain" of parallel light beams for safety/security monitoring. Any opaque object that blocks one of the beams will trigger the sensor, and thus sound an alarm or deploy other safety measures. However, since light beams travel in straight lines, the optical transmitter and receiver must be carefully aligned, and are typically found arranged with parallel beams. Light curtains are usually limited to the monitoring of planar protection areas. Although mirrors may be used to "bend" the beams around objects, this further complicates the design and calibration problems, and also reduces the operating range.

One major disadvantage of a light-curtain sensor is that there is a minimum resolution of objects that can even be detected, as determined by the inter-beam spacing. Any object smaller than the beam spacing could penetrate the "curtain" without being detected. Another disadvantage is that the light curtain, like most point-sensors, can only detect a binary condition (go/no-go) when an object actually interrupts one or more beams. Objects approaching dangerously close to the curtain remain undetected, and a fast-moving intruding object might not be detected until too late, thus forcing the designers to position the curtains further away from the danger areas in order to provide the necessary time-interval for safety measures. In addition, the safe operating range between the photo-transmitter and corresponding receiver can be severely limited in cases where chips, dust, or vapors cause dispersion and attenuation of the optical beam, or where vibrations and other machine movements can cause beam misalignment.

Furthermore, light curtains are susceptible to interference from ambient light, whether from an outside source, or reflected by a nearby object. This factor further limits the applications, making use difficult in locations such as outdoors, near welding operations, or near reflective materials. In such locations, the optical receivers may not properly sense a change in a light bean. Still further, light curtains are made from large numbers of discrete, sensitive, optical components that must be constantly monitored for proper operation to provide the requisite safety without false alarms. It is axiomatic that system reliability is reduced in proportion to the number of essential components and their corresponding failure rates. Microwave curtains are also available, in which focused microwave radiation is sent across an area to be protected, and changes in the energy or phasing at the distant receiver can trigger an alarm event. Microwave sensors have many of the same disadvantages of light curtains, including many false alarm conditions.

Ultrasonic sensor technologies are available, based upon emission and reception of sound energy at frequencies beyond human hearing range. Unlike photoelectric sensing, based upon optically sensing an object, ultrasonic sensing depends upon the hardness or density of an object, i.e., its ability to reflect sound. This makes ultrasonic sensors practical in some cases that are unsuitable for photoelectric sensors, however they share many common disadvantages with the photoelectric sensors. Most significantly, like many simple sensors, the disadvantages of ultrasonic sensors include that they produce only a binary result, i.e., whether or not an object has entered the safety zone. Similar problems exist for passive infrared sensors, which can only detect presence or absence of an object radiating heat.

Video surveillance and other measurement sensors are also known for use to automatically detect indications of malfunctions or intruders in secured areas. These types of known sensors are also limited to the simple detection of change in the video signal caused by the presence of an object, perhaps at some pre-defined location. These systems cannot detect the size or more importantly position of an object, since they are limited to sensing a twodimensional change in a scene. Another disadvantage of the video system is that it is limited to sensing motion or other change within the two-dimensional scanned scene, rather than other characteristics, such as the distance between objects. Furthermore, such systems cannot detect the number of intruding objects. They are unable to sense conditions under which a changed object creates an alarm condition, as opposed to an unchanged object, which will not create an alarm condition. Similarly, such systems disadvantageously can not provide an indication where two objects would be acceptable and one would create an alarm condition, and vice versa. Because of their simple construction, video systems are often used to periodically "sweep" an area, looking for changes. In this mode, the intruder can avoid detection by moving only when the camera is pointing away, and hiding behind other objects, creating the need for additional types of sensors to augment the video surveillance. Still further, video surveillance systems have no depth perception, and thus a small object near the camera could be perceived as equivalent to the image of a large object farther away. These and other disadvantages restrict the application of video surveillance systems, like the mechanical switch sensors, to simple, binary or "go/no-go" decisions about whether a new object has appeared.

More recently, proximity laser scanners (PLS) have been used to detect objects within a defined area near the PLS sensor. These systems are also known as Laser Measurement Systems (LMS). The PLS technology uses a scanning laser beam and measures the time-of-flight for reflected light to determine the position of objects within the viewing field. A relatively large zone, e.g., 50 meter radius over 180 degrees, can be scanned and computationally divided into smaller zones for early warnings and safety alarm or shutdown. However, like many of the other sensor technologies, the scanning laser systems typically cannot distinguish between different sizes or characteristics of objects detected, making them unsuitable for many safety or security applications. Significantly, the scanning laser systems typically incorporate moving parts, e.g., for changing the angle of a mirror used to direct the laser beam. Such moving parts experience wear, require precision alignment, are extremely fragile and are thus unreliable under challenging ambient conditions. Also, the PLS cannot discriminate between multiple objects and a single object in the same location. Nor can such systems detect the orientation and direction of the objects within the area being monitored. Thus, an object moving toward the target might raise the same alarm as an object in the same location moving away from the target, causing a false alarm in the PLS (or video surveillance, or other motion sensors). Also, the PLS cannot be used where a moving object is allowed in the area, i.e., the target object being protected is itself moving with respect to the sensor.

SUMMARY OF THE INVENTION

The present invention provides a three-dimensional (3-D) machine-vision safety-solution involving a method and apparatus for performing high-integrity, high efficiency machine vision. The machine vision safety solution converts two-dimensional video pixel data into 3-D point data that is used for characterization of a specific 3-D object, objects, or an area within view of a stereoscopic camera configured to provide a video safety "curtain." An object, multiple objects, or an area can be monitored, and are collectively called the "target" for purpose of discussion. The target is being protected from encroachment by another foreign object, called the "intruder."

According to the invention, the 3-D machine-vision safety-solution apparatus includes an image acquisition device such as two or more video cameras, or digital cameras, arranged to view a target scene stereoscopically. The cameras pass the resulting multiple video output signals to a computer for further processing. The multiple video output signals are connected to the input of a video processor adapted to accept the video signals, such as a "frame grabber" sub-system. Video images from each camera are then synchronously sampled, captured, and stored in a memory associated with a general purpose processor. The digitized image in the form of pixel information can then be stored, manipulated and otherwise processed in accordance with capabilities of the vision system. The digitized images are accessed from the memory and processed according to the invention, under control of a computer program. The results of the processing are then stored in the memory, or may be used to activate other processes and apparatus adapted for the purpose of taking further action, depending upon the application of the invention.

In further accord with the invention, the machine-vision safety solution method and apparatus involves two phases of operation: training and run-time. In the training phase, a scene containing a target is viewed by the stereoscopic cameras to collect reference image sets. Each reference image set contains digitized reference images captured substantially simultaneously from the video cameras (e.g., right and left). Using an appropriate stereopsis algorithm, the reference image sets are processed to obtain 3-D descriptive information about points corresponding to the reference object, or objects, or other surfaces in a reference area (i.e., the target). A set of 3-D points is registered as a model for the reference object or target, along with various other parameters that control the train-time operation, the run-time operation, and provide information about tolerances. During the run-time phase, an illustrative embodiment of the present invention uses the same image acquisition process to gather information about a monitored scene, and to determine 3-D information about the monitored scene. A set of run-time stereoscopic images are processed for 3-D information about any objects or physical entities in the scene, and a set of run-time 3-D points is generated, corresponding to the monitored scene. The train-time 3-D points are then compared with the run-time 3-D points, and a result is generated according to the specific needs of the application. In the most general case, the position of the intruder object relative to the target is calculated, i.e., the minimum distance. This distance can then be used to trigger various results. For example, if the safety rules require an alarm when a person approaches a machine from the wrong angle, the method and apparatus according to the invention might be configured to provide a result related to the position of the intruder with respect to the reference object. When an object meeting the specified 3-D criteria enters or approaches the danger location, appropriate safety measures might be triggered (alarm, shutdown, shield deployment, etc). On the other hand, the system could recognize that the intruding object is not in a position to indicate the presence of an object in or approaching a hazardous location, and would therefore allow the operation to continue.

Features of the present invention include the ability to generate a wide variety of realtime 3-D information about 3-D objects in the secured area at run-time. Using the system according to the invention, distance from one object to another can also be calculated, allowing the safety or security system to enforce proximity rules. Multiple objects can be detected in positions that result in different output results for each object (e.g., alarm or not). The results can depend upon the 3-D position of the intruder object with respect to the target, based upon the 3-D data points detected for the intruder object. Results can also be measured in terms of distance between multiple intruder objects. Furthermore, the 3-D video safety method and apparatus can be configured to permit 3-D motion of the target, such as moving parts, vibration or rotation. It can also be used to identify and permit expected positional changes of the target object within the protected area.

Comparison of a monitored target to a reference target based on position or spatial relationships between 3-D objects (e.g. near, far), and other safety-related 3-D information (e.g., object size, orientation), can be determined according to the invention without using sensors that must be specially designed, placed, or calibrated for each different type of object to be protected, or the type of safety information that must be measured. The system requires substantially less reliance on moving mechanical parts subject to the rigors of wear and tear. Calculation of 3-D information about objects observed in the safety solution according to the invention overcomes numerous disadvantages of the prior art by allowing safety rules to be defined based upon derivation of 3-D information about particular 3-D objects and their relative locations and orientations, not just the presence of some ambiguous difference within the scene being viewed (i.e., simple "motion" or "change"). It is not necessary for the invention to be placed very close to, or in contact with the hazard, as would be necessary for mechanical sensors. Machine vision systems offer a superior approach to security and safety sensors by processing images of a scene to detect and quantify the objects being viewed. Machine vision systems can provide, among other things, an automated capability for performing diverse inspection, location, measurement, alignment and scanning tasks.

Other advantages of the invention are that it may be used to capture and process a series of several run-time images, and calculate a 3-D trajectory of the moving object. This information may be very important for detecting the approach of an intruder on a collision course with a hazardous area. Another feature of the invention is the ability to display the target object, the intruder objects, and the shortest (minimum) distance vector. Another feature of the invention is the ability to automatically store (and archive) digitized images of the scene in which an infraction of the safety or security rules existed, for later review.

BRIEF DESCRIPTION OF THE DRAWINGS

These and other features of the present invention will be better understood in view of the following detailed description taken in conjunction with the drawings, in which.

DETAILED DESCRIPTION

Figure 1:
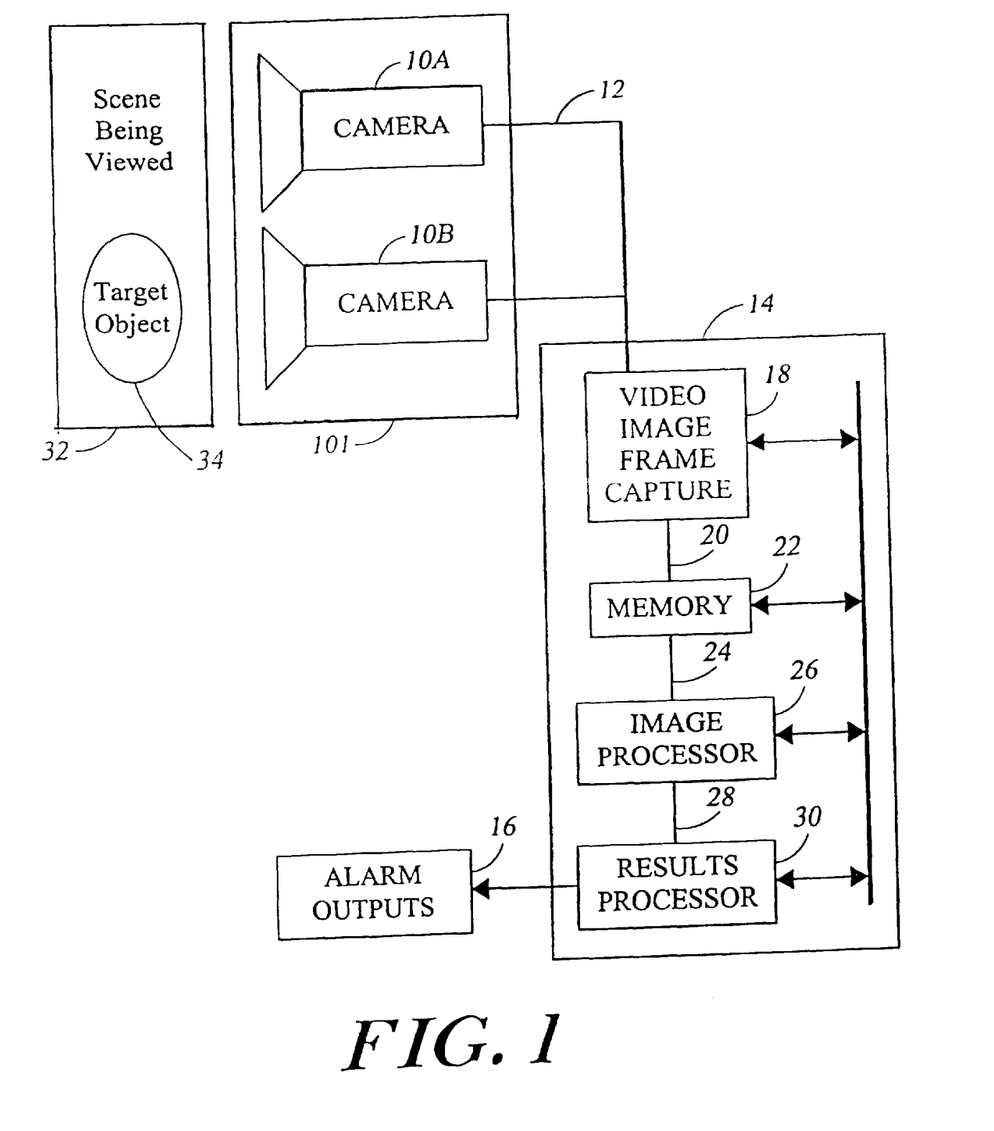
FIG. 1 is a functional block diagram of a video safety curtain system, according to the invention.

A vision system implemented in a security and safety embodiment according to the invention is illustrated in FIG. 1. The system incorporates an image acquisition device 101, comprising at least two cameras 10a, 10b, such as the Triclops model available from Point Grey Research, Vancouver B.C. The cameras 10a, 10b send a video signal via signal cables 12 to a video safety and security processor 14. The two cameras 10a, 10b are both focused on a scene 32 to be monitored. The video safety and security processor 14 includes a video image frame capture device 18, image processor 26, and results processor 30, all of which are connected to a memory device 22. Generally, digitized video image sets 20 from the video image capture device 18, such as a 8100 Multichannel Frame Grabber available from Cognex Corp, Natick, Mass., or other similar device, are stored into the memory device 22. The image processor 26, implemented in this illustrative embodiment on a general purpose computer, receives the stored digitized video image sets 24 and generates a 3-D data set 28. The 3-D data set 28 is delivered to the results processor 30 which generates results data 32, as described in detail hereinafter. The results data 32 effect results as a function of the application, and may, for example, be fed to the alarm output 16.

Figure 2:
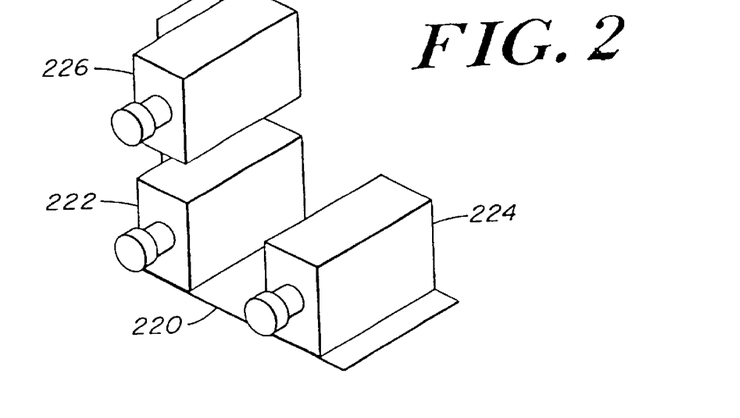
FIG. 2 is an illustration of a trinocular camera arrangement adapted for use in acquiring images for processing according to the invention.

The image acquisition device 101 in the illustrative embodiment comprises an arrangement, as illustrated in FIG. 2, for acquiring image information. In the illustrative arrangement, three cameras: a right camera 222, a left camera 224, and a top camera 226 are mounted on an L-shaped support 220, with two of the cameras, the left camera 222 and the right camera 224 side-by-side, forming a line, and the third, top camera 226 mounted out of line with the other two 222, 224.

Figure 3:
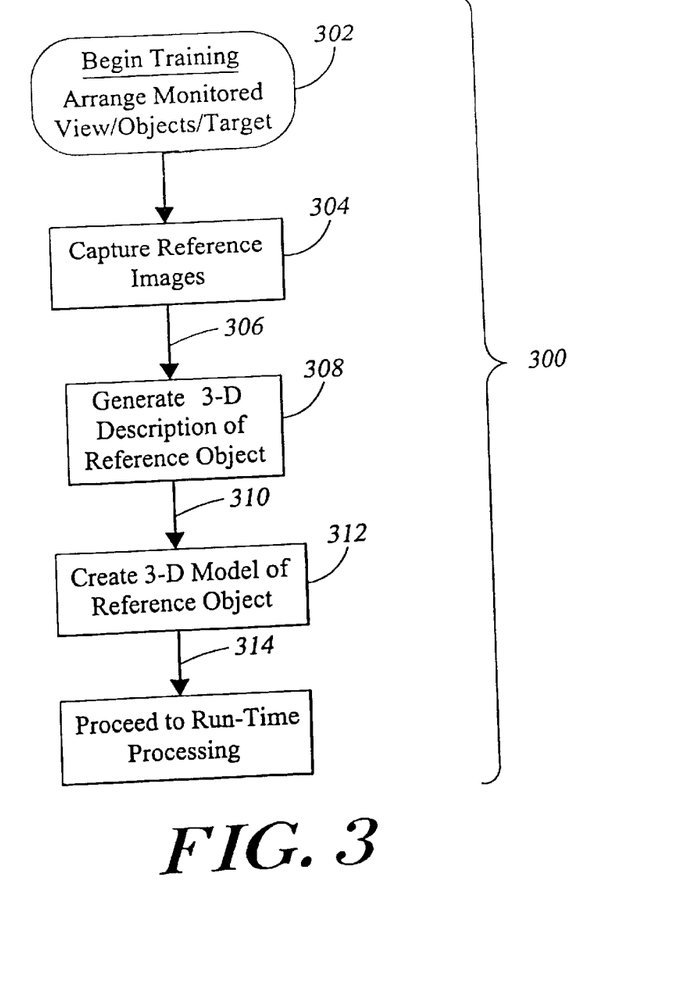
FIG. 3 is a flow diagram illustrating training of the video safety curtain system according to the invention.
Figure 4:
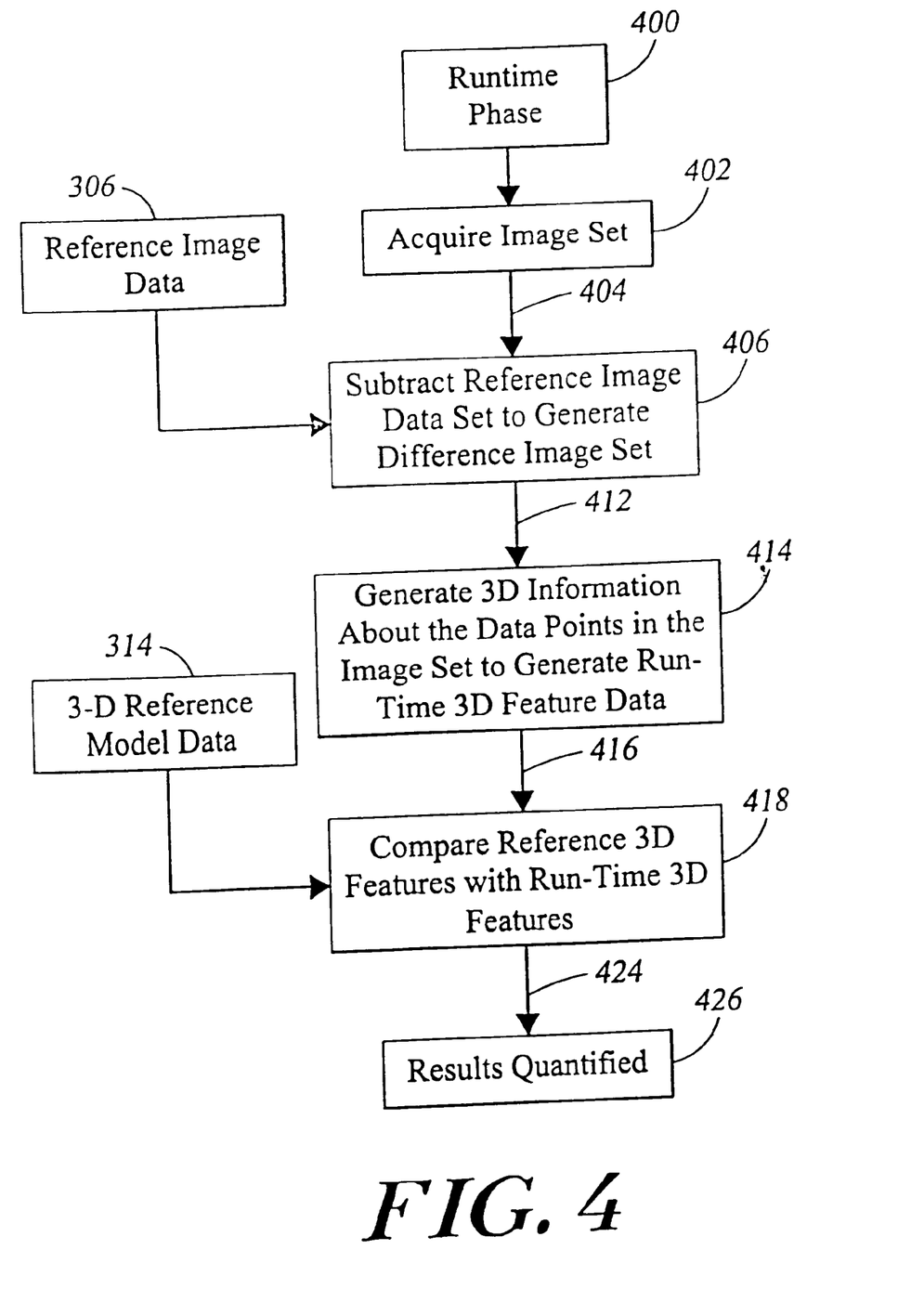
FIG. 4 is a flow diagram illustrating the run-time processing of video images according to the invention.

FIGS. 3 and 4 provide an overview of two phases of operation according to the invention, a train-time process 300 (FIG. 3) which is normally followed by a run-time process 400 (FIG. 4). Referring now to FIG. 3, a first step 302 in the training process 300 requires an operator to arrange the image acquisition device 101 on the view/target, and any pertinent objects 34 in the scene to be monitored 32. This arrangement step 302 includes selection of the lighting, appropriate placement of objects 34 and other elements in the scene 32 which are desired as a reference against which run-time changes will be measured. It should be appreciated that structured lighting, as known in the art, could be implemented in the scene during this arrangement step in order to optimize characteristics of the scene for imaging as a function of the application. This step also includes the calibration and adjustment of the focal length, baseline, focus and other parameters of the image acquisition device 101. An operator may observe the scene 32 through a viewfinder of the image acquisition device 101, and/or in temporary test images captured and displayed on a monitor (not shown) configured with the video image safety and security processor 14. The scene 32 can be adjusted to account for the texture and color of targets/objects 34 and background for generating useful/optimized images.

Once the scene 32 is ready for image capture during train-time, the operator causes the system to capture a reference image set 306. This step is optionally implemented, for purposes of speed enhancement. If and when implemented, a plurality of video image signals are captured in a way that the image from each camera 222, 224, 226 is captured at substantially the same instant. This synchronization can be accomplished by having the video image frame capture device 18 send a timing or synchronization signal to each camera 222, 224, 226, or one camera may act as a master and generate a timing or synchronization signal to the others. The video signals from the image acquisition device 101 are digitized by the video image frame capture device 18, and stored into the memory device 22 for further processing. The video image frame capture device 18 includes digitizing circuitry to capture the video image input from the image acquisition device 101 and convert it at a high resolution to produce a digital image representing the two-dimensional scanned video image as a digital data set. Each data element in the data set represents the light intensity for each corresponding picture element (pixel). The digital data set generated from each camera 222, 224, 226 is stored in memory 22, and a reference image set 306 is made up of all the digital data sets generated by the image acquisition device at substantially the same given instant. This reference image set represents the image set of the target/object/area to be monitored. Additional train-time frames can be captured and reference image sets can be collected for analysis. Capture of a plurality of images or reference video signals facilitates use of an average for the reference image, i.e. frame averaging, which results in a better signal-to-noise ratio.

The next step 308 of the training phase 300 is to generate a 3-D description 310 of the monitored scene 32, and more specifically, of any 3-D object 34 that may be a target in the scene 32. The 3-D description 310 may be provided as a function of the reference object/target by, for example, an analytical equation of the object in 3-D space. Alternatively, where the analytical equation is not available, a generalized representation is used whereby each reference image set 306 is processed to extract stereoscopic information. Since a reference data set 306 contains images digitized from multiple cameras 222, 224, 226 at substantially the same instant, stereoscopic processing of the reference image set 306 results in the computation of 3-D information (i.e., location) in the form of a set of 3-D points that correspond to an edge or other boundary of the object 34 in the monitored scene 32. Reference image sets 306 are stereoscopically processed pair-wise, whereby the digitized images from the left camera 222 and right camera 224 are processed, and the digitized images of the top camera 226 is processed with the digitized image of the right camera 222. By combining the 3-D data derived from these two sets of pair-wise processing results, the illustrative embodiment of the invention obtains a set of 3-D data points 310 for object 34 in the scene 32. It should be noted that if the embodiment is implemented with only a pair of horizontal cameras, then the 3-D information on horizontal features will be poor or non-existent.

Once a set of 3-D data points 310 has been generated, the illustrative embodiment proceeds to the step 312 of creating a 3-D model 314 of the object in the scene during the training phase. The 3-D points are obtained only at the boundaries of the objects and these 3-D boundary points are called "3-D features." Boundary points include the occlusion boundaries due to surface discontinuities, as well as the texture boundary points observed due to texture of a surface. Specific 3-D features may be derived by any of several well-known edge segmentation processes, such as taught by Gonzalez and Wintz in Digital Image Processing, Second Edition, followed by a stereo algorithm, such as described in Structure From Stereo—A Review, Dhond, Umesh R, and Aggarwal, J. K., IEEE Transactions On Systems, Man, And Cybernetics, Vol. 19, No, 6, November/December 1989, both of which are incorporated herein by reference. A generalized representation of an object 34 will always be possible by defining a set of three-dimension data points 310. If the target has moving parts, it is desirable to get the union of train-time features obtained at different time phases of motion of the target. An operator may also manipulate the train-time reference model to include or exclude selected 3-D points or even 3-D objects. It should be further appreciated that if the target under consideration can be represented in an analytical form, then the corresponding equation can be used instead of a set of points.

As a further step of the training phase 300, the 3-D model 314 created for the reference object 34 has additional parameters associated with it, such as tolerance parameters and other parameters that control the generation of train-time features and run-time features. Other generic parameters can also be included, such as those related to the safety mission of the system (e.g., the location of 3-D zones in which objects are permitted or prohibited, relative severity of hazards in each such zone, etc). The information collected in the training phase 300 comprises the reference image set 306, the 3-D model 314, and the corresponding set of parameters. The reference model is stored in memory 22 in preparation for comparison with run-time data representing the target/objects found in the scene 32 at run-time, as described in detail hereinafter.

Referring now to FIG. 4, after a 3-D model 314 has been generated in the training phase 300, the illustrative embodiment is ready to enter the run-time phase 400. During run-time, the object/target 34 may have changed, or additional objects may have entered the scene 32. The goal of the method and apparatus in the illustrative embodiment according to the invention is to automatically discern changes such as these, and generate descriptive information output that can be interpreted, for example, to output the desired alarm conditions.

Using the same image acquisition device 101 as was used during training and described hereinbefore, a run-time image set 404 is acquired 402 in the first step of the run-time processing. The run-time contents of scene 32 will include many of the same elements found during the training phase. Thus the reference image set 306 may be optionally subtracted from the runtime image set 404. The subtraction step 406 significantly reduces the amount of data that must be processed in the later steps of the runtime phase. The resulting difference data set 412 is then passed along to the next runtime step 414 for generating the 3-D runtime features 416 of the object 34 and any other features of the scene 32 that have changed from training time.

Generation 414 of the 3-D runtime features 416 includes the same type of pair-wise stereoscopic processing of the runtime image set 412 as was done for the training phase reference image set 306, and described hereinbefore. Further processing of the stereoscopic data generates the 3-D runtime features 316, in the same way that the 3-D reference model 314 was generated in training time.

The 3-D runtime features are then compared 418 to the 3-D reference model 314 generated in the training phase 300. The difference result 424 of this comparison step 418 is a 3D description of the changes in the 3-D features in the scene 32 from the 3-D reference model 314 created during training time. The difference result 424 is then quantified 426 with respect to the 3-D reference model 314 and its corresponding reference parameters, and with respect to the 3-D runtime features. The step of results quantification 426 involves the measurement of the difference result 424 found in the comparison step 418, and use of the quantification, such as by classification of the type of difference (e.g., 3D position, size number of objects). The results quantification step 426 may include evaluation of threshold parameters that determine whether an intruder object has violated any of the safety or security rules, such as moving into a defined danger zone of the scene 32, or moving too close to a reference object 34.

For example, in an illustrative embodiment, the run-time points are organized as chains (connected boundary points). A loop is executed through the chains and the various features on the chain and for each run-time feature the nearest target point (i.e. train-time feature) is computed. Run-time points are divided into two sets: belonging to the target/object or belonging to an intruder. A run-time point is said to belong to the target if it is within a certain threshold distance (called the target zone). A run-time point is said to belong to the intruder if it is greater than or equal to the target zone distance and less than a certain threshold distance (called the guard zone). If a minimum number of contiguous run-time features satisfy the intruder test, then it is considered to be an intrusion. Such an implementation can be divided further to provide multi-tiered outputs where the computed distances between the intruder and the nearest target feature can be compared to several zones which have mutually exclusive preset ranges or boundaries, and desired outputs are stored for each zone.

Figure 5:
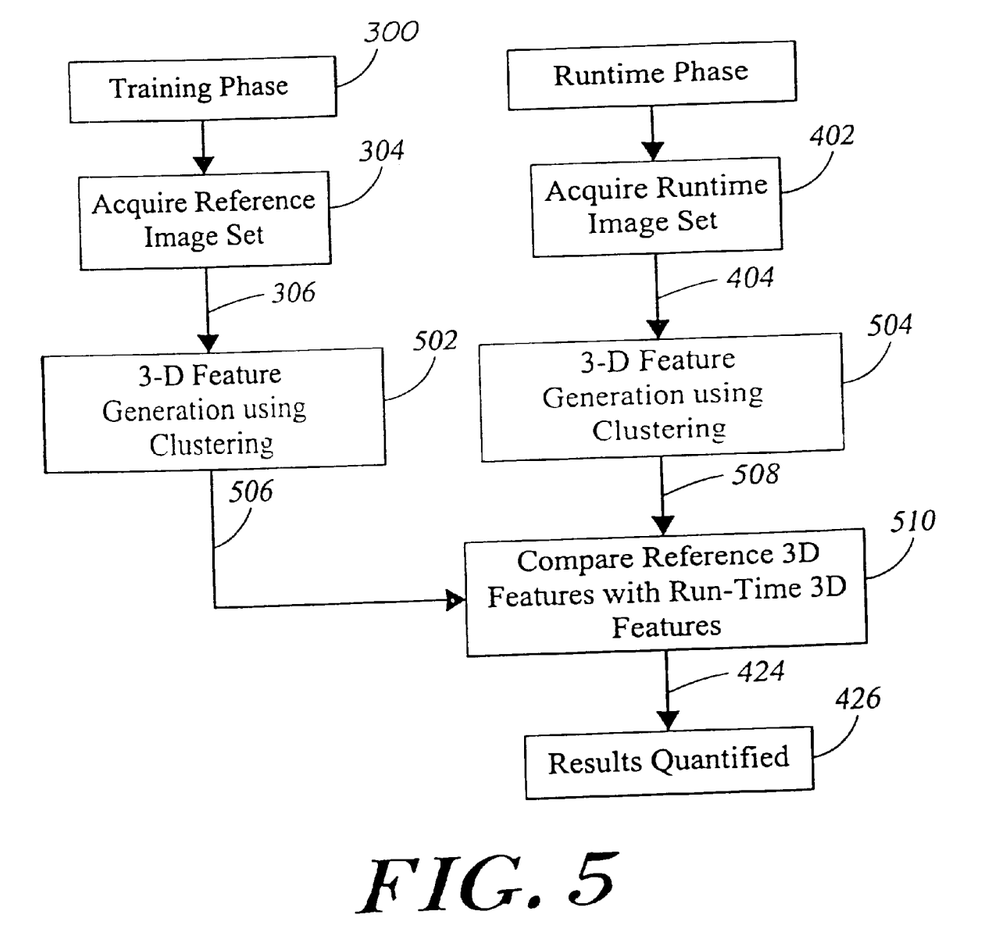
FIG. 5 is a flow diagram of an alternative embodiment of the invention.

In some cases where the invention will be used, ambiguity may arise between the training phase and the run-time phase if an object 34 moves or changes. An alternative embodiment of the invention uses a slightly different process that may reduce the number of false alarm conditions. In reference to FIG. 5, the training phase proceeds as before, with the initial step of 304 acquiring a reference image set 306. However, unlike the previously described steps in the training phase, here the stereo step 502 generates 3-D features and then uses them to generate a set of 3-D object data 506 through the process of "clustering" of the 3-D data points into "clouds" that correspond to one 3-D object or another in the scene 32. Any of various clustering algorithms can be implemented to produce the clouds of 3-D data points corresponding to respective 3-D objects in the scene, such as described in Duda, Richard and Hart, Peter, "Pattern Classification and Scene Analysis," Chap. 6, Pp. 189–256, Wiley Interscience Publications, Wiley & Sons, which is incorporated herein by reference. During run-time processing, a similar series of steps is carried out: acquiring runtime data set 404, and processing that runtime data set to obtain 3-D runtime features 508 based upon the same "clustering" of the 3-D runtime data points into 3-D "clouds" of features.

It should be appreciated that alternative approaches could be implemented whereby the 3D scene is segmented into objects. Therefore, at train-time and run-time there is an additional step of taking the 3D points (features) and partitioning them into cluster clouds that correspond to different 3D objects. This might limit the objects one may be able to train in the scene, as the segmentation may not be always successful in segmenting the scene into distinct 3-D objects. However, if it is possible to segment the scene into objects, the comparison step at run-time must also be extended so that the objects at run-time are processed to consider only those objects that do not correspond to the ones trained. This is trivial because the target is static. The objects that do not correspond to the target objects are considered as potential intruder objects and are compared against the target objects just as before (using the nearest point-to-point distance measurement scheme). The results of the system are output as described hereinbefore. The advantage of such an approach is that it may potentially be more robust. This is because in the described point-based approaches any points that fall within the target zone of the target is considered to belong to the target and anything outside it to a potential intruder object. It is less likely that a point within the target zone actually corresponds to the intruder, especially if the processing cycle times are fast. However, there may be cases (especially with moving machinery) where a point outside the target zone belongs to the target, in which case a false alarm is issued. An object-based technique as described above helps get rid of this problem, as there is no longer a concept of a target zone. The run-time objects are explicitly classified into target objects and intruder objects, and then only a guard zone constraint is applied around the target objects for all the intruder objects.

Although the illustrative embodiment is described herein as including an optional runtime subtraction step 406, it should be appreciated that this step is included for computational economy, and that the runtime results will be equivalent without such a step. Similarly, the image set acquired at run-time may be mapped through a look-up table to allow for changes in lighting relative to the training image phase.

Although the illustrative embodiment is described herein as including a method and apparatus where the target is in sight, it should be appreciated that it is not always necessary to be able to "see" the target with the imaging device (camera). That is, the system can be implemented in a context where the target is not seen, but only the intruder is imaged. In this case, the train-time points are obtained from another camera or another range finder (i.e. virtually any device that provides 3D points).

Although not specifically described for application to a moving object 34, it should be appreciated that the method and apparatus described herein would apply equally well if the target is moving. Such an implementation, however, puts an onus on the comparison implemented, as the object correspondence problem becomes non-trivial. This is because points on the object that were visible could no longer be visible and vice versa. Further, due to a varying dynamic scene (where only the target and intruder are moving while everything else is stationary), it is possible that objects that were separate at train-time may get merged at run-time and vice versa. However, once the object correspondence is established, such as by techniques known to those skilled in the art, the methodology is effected substantially as described hereinbefore.

As another alternative application of the present method and apparatus, it should be appreciated that the step 426 of processing runtime results can be configured to "track" a moving object. Rather than simply compare 3-D data between training phase and run-time phase, the results processing 426 can incorporate a counter or timer, or other factors that will withhold an alarm condition until a threshold is reached. In this way, an object can be tracked through successive frames captured during successive runtime comparisons. Velocity and location parameters, called the trajectory, can then be used, in a process known as "trajectory computation," to identify the desired alarm conditions. For example, an object on a collision course with a danger area may trigger an alarm, but an object moving in a different direction would not.

Although the invention is described with respect to an identified method and apparatus for image acquisition, it should be appreciated that the invention may incorporate other data input devices, such as digital cameras, CCD cameras, video tape or laser scanning devices that provide high-resolution two-dimensional image data suitable for 3-D processing.

Similarly, it should be appreciated that the method and apparatus described herein can be implemented using specialized image processing hardware, or using general purpose processing hardware adapted for the purpose of processing data supplied by any number of image acquisition devices. Likewise, as an alternative to implementation on a general purpose computer, the processing described hereinbefore can be implemented using application specific integrated circuitry, programmable circuitry and the like.

Furthermore, although particular divisions of functions are provided among the various components identified, it should be appreciated that functions attributed to one device may be beneficially incorporated into a different or separate device. Similarly, the functional steps described herein may be modified with other suitable algorithms or processes that accomplish functions similar to those of the method and apparatus described.

Although the invention is shown and described with respect to an illustrative embodiment thereof, it should be appreciated that the foregoing and various other changes, omissions, and addition in the and detail thereof could be implemented without changing the underlying invention.

What is claimed is:

1. A method of implementing a machine vision system to compare a model of a 3-D reference target in a viewed scene to a runtime scene, said method comprising:

storing information related to said model of said 3-D reference target, said model including a set of 3-D points related to said 3-D reference target;

acquiring information related to said runtime scene;

processing said information related to said runtime scene to form stereoscopic information including a set of 3-D points related to said runtime scene;

comparing said set of 3-D points related to said 3-D reference target with said set of 3-D points related to said runtime scene; and defining any 3-D entity in said runtime scene other than said 3-D reference target as an intruder;

wherein the step of storing information related to said model of said 3-D reference target involves generating said set of 3-D points in the form of a first set of 3-D objects related to said 3-D reference target using a first clustering algorithm, and/or the step of acquiring information related to said runtime scene involves generating said set of 3-D points in the form of a second set of 3-D objects related to said runtime scene using a second clustering algorithm.

2. The method of claim 1 in which said step of storing information related to said model of said 3-D reference target further comprises the steps of:

collecting a plurality of images of said 3-D reference target during a training phase; and processing said plurality of images for stereoscopic information to develop said set of 3-D points corresponding to the 3-D reference target.

3. The method of claim 1 in which said step of acquiring information related to said runtime scene further comprises the step of:

collecting a plurality of successive images of said runtime scene in a runtime phase, where said runtime scene contains at least said 3reference target.

4. The method of claim 1 further comprising the step of:

subtracting the information related to said model of said 3-D reference target from the information related to said runtime scene to reduce information prior to said step of processing said information.

5. The method of claim 1 in which the step of comparing further comprises the step of:

calculating a 3-D distance from said 3-D reference target to each intruder.

6. The method of claim 1 further including the step of generating an output corresponding to a 3-D position of any said intruder relative to said 3-D reference target.

7. The method of claim 6 in which said step of generating said output corresponding to said 3-D position of any said intruder further comprises the steps of:

calculating a 3-D distance between each 3-D point of said 3-D reference target and each 3D point of said intruder to create a set of distances including a shortest distance; and determining whether said shortest distance is less than a predetermined threshold distance.

8. The method of claim 1 in which said step of storing information related to said model of said 3-D reference target further comprises the steps of:

focusing a stereoscopic camera on said viewed scene;

collecting a substantially synchronous plurality of frames of video of said viewed scene;

digitizing said plurality of frames to create a set of digitized frames forming said information related to said model.

9. The method of claim 1 in which said step of acquiring information related to said runtime scene further comprises the steps of:

focusing a stereoscopic camera on said runtime scene;

collecting a substantially synchronous plurality of frames of video of said runtime scene;

digitizing said plurality of frames to create a set of digitized frames forming said information related to said run-time scene.

10. The method of claim 9 further comprising the steps of:

storing said set of digitized frames in a memory; and repeating said collecting, digitizing and storing steps for each of a plurality of runtime scenes.

11. A method of implementing a machine vision system to detect an intruder in a viewed scene, said method comprising the steps of:

developing a 3-D reference model of said viewed scene, said reference model including a set of 3-D reference points;

acquiring a runtime version of said viewed scene, said runtime version including a set of 3-D runtime points;

comparing said set of 3-D reference points to said set of 3-D runtime points to determine a difference between said set of 3-D reference points and said set of 3-D runtime points; and obtaining a position of any said intruder in said viewed scene as a function of said difference between said set of 3-D reference points and said set of 3-D runtime points;

wherein the step of developing said 3-D reference model involves generating said set of 3-D reference points in the form of a first set of 3-D objects using a first clustering algorithm, and/or the step of acquiring a runtime version involves generating said set of 3-D runtime points in the form of a second set of 3-D objects using a second clustering algorithm.

12. The method of claim 11 in which said step of developing a 3-D reference model further comprises the steps of:

collecting a plurality of images of said viewed scene during a training phase;

processing said plurality of images for stereoscopic information about any entity within the viewed scene to develop said set of 3-D reference points.

13. The method of claim 11 in which said step of acquiring said runtime version of said viewed scene further comprises the steps of:

collecting a plurality of images of said viewed scene in a runtime phase;

processing said plurality of images for stereoscopic information about any entity within the viewed scene to determine said set of 3-D runtime points.

14. The method of claim 11 further comprising the step of:

subtracting said set of 3-D reference points from said set of 3-D runtime points to reduce information prior to said step of comparing.

15. The method of claim 11 further including the step of generating an output corresponding to a 3-D position of any said intruder relative to said 3-D reference model.

16. The method of claim 15 in which said step of generating said output corresponding to said 3-D position of any said intruder further comprises the steps of:

calculating a 3-D distance between each 3-D point of said 3-D reference model and each 3-D point of said intruder to create a set of distances including a shortest distance; and determining whether said shortest distance is less than a predetermined threshold distance.

17. A machine vision apparatus to detect an intruder in a viewed scene, comprising;

an image acquisition device;

a processor including, means for developing a 3-D reference model of said viewed scene including a set of 3-D reference points;

means for acquiring a runtime version of said viewed scene including a set of 3-D runtime points; and means for comparing said set of 3-D reference points to said set of 3-D runtime points to determine a difference between said set of 3-D reference points and said set of 3-D runtime points;

said apparatus further comprising at least one means for generating said set of 3-D reference points in the form of a first set of 3-D objects using a first clustering algorithm, and means for generating said set of 3-D runtime points in the form of a second set of 3-D objects using a second clustering algorithm.

* * * * *